US006877765B2

(12) United States Patent
Rose et al.

(10) Patent No.: US 6,877,765 B2
(45) Date of Patent: Apr. 12, 2005

(54) LOAD PATH CONTROL FOR INFLATABLE AIRBAG

(75) Inventors: Larry D. Rose, South Weber, UT (US); Marc P. Russell, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 71 days.

(21) Appl. No.: 10/241,909

(22) Filed: Sep. 11, 2002

(65) Prior Publication Data

US 2004/0046365 A1 Mar. 11, 2004

(51) Int. Cl.[7] ............................................... B60R 21/16
(52) U.S. Cl. .................................. 280/728.2; 280/743.1
(58) Field of Search ........................... 280/743.1, 728.2, 280/731, 732

(56) References Cited

U.S. PATENT DOCUMENTS

| | | | | |
|---|---|---|---|---|
| 5,344,182 | A | 9/1994 | Lauritzen et al. | 280/728 A |
| 5,398,961 | A | 3/1995 | Rogers et al. | 280/728.2 |
| 5,443,284 | A | 8/1995 | Strahl et al. | |
| 5,509,685 | A * | 4/1996 | Boyle, III | 280/728.2 |
| 5,518,266 | A | 5/1996 | O'Docherty et al. | |
| 5,560,645 | A | 10/1996 | Lewis et al. | 280/728.2 |
| 5,588,668 | A | 12/1996 | Emambakhsh et al. | 280/728.2 |
| 5,642,900 | A * | 7/1997 | Patel | 280/728.2 |
| 5,727,812 | A | 3/1998 | Dykstra et al. | 280/731 |
| 5,826,913 | A | 10/1998 | Mramor | 280/728.2 |
| 5,836,608 | A | 11/1998 | Soderquist et al. | 280/728.2 |
| 5,931,491 | A | 8/1999 | Bosgeiter et al. | 280/728.2 |
| 5,997,037 | A | 12/1999 | Hill et al. | 280/743.1 |
| 6,029,992 | A * | 2/2000 | Vendely et al. | 280/728.2 |
| 6,070,904 | A | 6/2000 | Ozaki et al. | 280/743.1 |
| 6,155,599 | A | 12/2000 | Bowers et al. | |
| 6,168,203 | B1 | 1/2001 | Amamori | 280/743.1 |
| 6,183,003 | B1 | 2/2001 | Matsuhashi et al. | 280/728.2 |
| 6,467,799 | B2 * | 10/2002 | Adomeit et al. | 280/728.2 |
| 2001/0054813 | A1 * | 12/2001 | Keshavaraj | 280/743.1 |

FOREIGN PATENT DOCUMENTS

| | | | | |
|---|---|---|---|---|
| JP | 403248944 | | 11/1991 | B60R/21/16 |
| JP | 406115403 | | 4/1994 | B60R/21/20 |
| WO | WO - 02/087930 | | 11/2002 | |

\* cited by examiner

Primary Examiner—David R. Dunn
(74) Attorney, Agent, or Firm—Sally J. Brown

(57) ABSTRACT

An airbag cushion for protecting an occupant of a vehicle from an impact is presented. The airbag cushion has an inflatable region which inflates upon the reception of an inflation gas from an inflator. The airbag cushion is secured to a housing by a retaining member. The retaining member is configured to secure an attachment region of the airbag cushion to the housing by the use of fasteners which create a clamping force. The clamping force is highest adjacent the fasteners and is lowest at positions between the fasteners. Thus, a high clamp region is created adjacent the fasteners and a low clamp region is created at positions distant from the fasteners. As the airbag cushion is inflated, a load force puts tension on the attachment region of the airbag cushion potentially ripping the airbag cushion out from the low clamp regions. A load controlling cutout is positioned within the attachment region and between the fasteners. The load controlling cutout is configured to shift the load force the low clamp region to the high clamp region during inflation of the inflatable region.

50 Claims, 6 Drawing Sheets

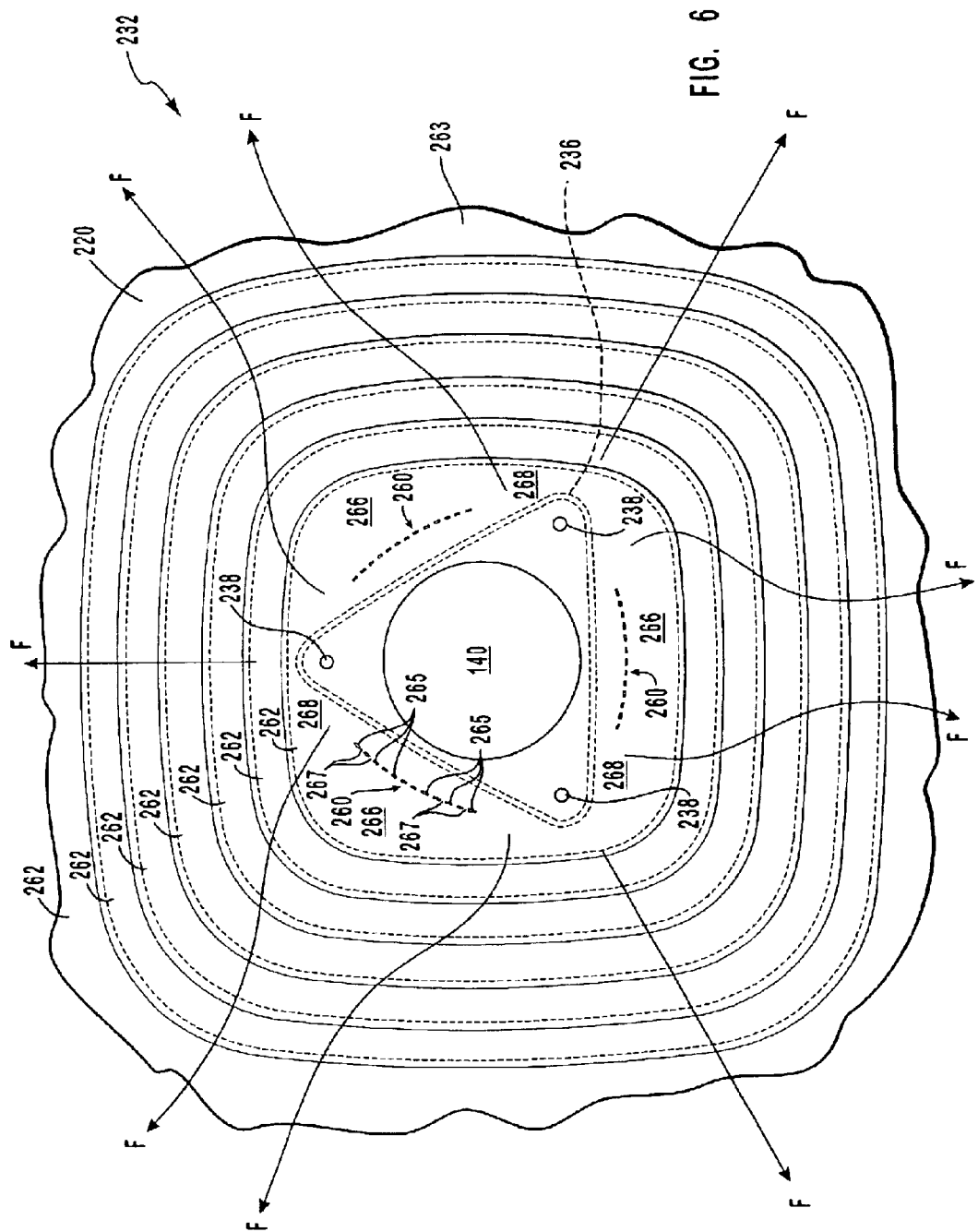

LOAD PATH CONTROL FOR INFLATABLE AIRBAG

BACKGROUND OF THE INVENTION

1. Field of the Invention

The present invention relates to vehicular airbag cushions. More specifically, the present invention relates to a load path control which redirects a load force in an inflating airbag cushion.

2. Technical Background

Inflatable safety restraint devices, or airbags modules, are now required by law to be installed in most new vehicles. Inflatable vehicle occupant safety restraint modules, or airbag modules, are mandatory on most new vehicles. Airbag modules commonly contain a collision sensor, an inflator, and an airbag cushion. In the event of an accident, a collision sensor such as an accelerometer, measures abnormal deceleration and triggers the inflator by means of an electronic signal. The inflator is generally a pyrotechnic device which produces gas. The inflator is connected to the airbag cushion and inflates the airbag cushion through an opening.

Prior to inflation, the airbag cushions are housed in an uninflated and folded condition to minimize space requirements. Typically the airbag module is housed in the steering wheel on the driver's side of a vehicle and in the dashboard on the passenger side of a vehicle. Upon receipt of the signal from the collision sensor, the inflator rapidly produces a quantity of inflation fluid or gas which inflates the cushion and protects the passenger from harmful impact with the interior of the car.

The airbag cushion and inflator must be securely mounted to the vehicle for proper function and positioning of the airbag cushion. Therefore, airbag modules typically have a housing which can be securely mounted within the dashboard or steering column. The housing serves the dual purpose of protecting the airbag cushion from damage in the stored configuration and securely holding the airbag cushion in the inflated configuration.

The airbag cushion is typically secured to the housing by a retaining member. The retaining member can be slid into the inflation opening of the airbag cushion. Adjacent the inflation opening, the airbag cushion has an attachment region which has a plurality of attachment points through which the airbag cushion can be attached to the housing. Generally, the attachment points are holes within the attachment region which are configured to receive fasteners. The fasteners run from the retaining member, though attachment points in the airbag cushion, and to the housing. As the fasteners, which are typically bolts, are tightened the airbag cushion is sandwiched between the housing and the retaining member. Thus, the airbag cushion is firmly attached to the housing and remains in position during inflation.

However, when the inflator is activated, the airbag cushion inflates with great force and rapidity. This large force places significant stress on the attachment region of the airbag cushion. This stress may cause the airbag cushion to tear out from under the retaining member. Such tearing can cause the inflation gas to flow outside of the cushion, limiting the efficacy of the restraint device. Additionally, a torn airbag may deflate before fully protecting an occupant from impact.

To overcome some of the issues associated with airbags tearing out from the retaining member under the stress from inflation, the attachment region can be reinforced with one or more layers of reinforcement material. Such material is typically the same material as used in the remainder of the airbag cushion, but may be another material selected for its strength. The reinforcement layers are secured to the airbag cushion by sewing, gluing, welding, weaving, and like attachment methods.

Airbag modules with reinforced attachment regions exhibit improved ability to withstand the load forces of the inflating airbag. However, when the retainer member and airbag cushion are secured to the housing, the clamping force applied to the sandwiched attachment region of the airbag is unequal. In particular, a high clamping force is applied in the region adjacent the fasteners, and a low clamping force is applied in the region between fasteners. This difference in clamping force is a function of the limited stiffness of the retainer member. The airbag cushion can more readily tear out from the areas with a low clamping force creating the same problems with gas loss and airbag integrity discussed above.

The approaches that are currently used to overcome the tearing associated with the low clamp areas increase the cost and weight of the airbag module. Two of the approaches commonly used are the use additional fasteners and the addition of extra layers of reinforcement material. The additional fasteners increase the number of high clamp areas and therefore reduce the size of the low clamp areas. Likewise, the addition of more layers of reinforcement material results in a reduction in the size of the low clamp area. The cost of each airbag unit is increased by the addition of fasteners and layers of reinforcement material. Additionally, each of these approaches adds weight to the airbag module which increases the cost associated with manufacture, shipping, and installation of the airbag modules. Moreover, the use of extra fasteners can increase the time and difficulty associated with manufacture and installation of the airbag modules.

In light of the foregoing, it would be an advancement in the art to provide an airbag module that would be resistant to tearing under the stress of inflation. It would be an additional advancement if the airbag module were resistant to tearing without increasing the cost or manufacturing the airbag module. It would be a further advancement if the airbag module were resistant to tearing without increasing the weight of the airbag module. It would be a further advancement if the airbag module were resistant to tearing without the use of additional fasteners or layers of reinforcement material. It would be an additional advancement if the airbag module could transfer the force of the inflating airbag cushion from a low clamp area to a high clamp area. Such an airbag module is disclosed and claimed herein.

SUMMARY OF THE INVENTION

The present invention relates to an airbag cushion for protecting an occupant of a vehicle from an impact. Such an airbag cushion has an inflatable region which can be inflated by the infusion of an inflation gas from an inflator. The inflator is generally connected to an accelerometer or other collision sensor which detects changes in the direction and speed of the vehicle. Sudden changes in speed and direction can indicate a crash. When the accelerometer detects a crash, the inflator is activated causing the inflation gas to flow into an inflation opening in the airbag. The inflatable region of the airbag fills with the inflation gas and protects the occupants of the vehicle.

The airbag cushion has an attachment region which allows the airbag to be attached to a housing and secured within the vehicle. The attachment region is generally positioned adjacent the inflation opening of the airbag. A retaining member can be used to secure the airbag cushion to the housing. A portion of the attachment region of the airbag cushion may be sandwiched between the retaining member and the housing. One or more fasteners are then used to securely attach the retaining member to the housing. Such fasteners may be bolts, clamps, or the like, which can be tightened to prevent the airbag from being released from this sandwiched position.

The clamping force created by the housing and the retaining member varies depending on the proximity to the fastener. For example, a high clamp region may be created in the area closest to the fasteners, and a low clamp region is created in the area between fasteners. It will be appreciated that the clamping force gradually decreases at each distance from the fasteners. Likewise, the clamping force gradually increases as distance from the fastener decreases.

As the airbag cushion inflates, a large amount of stress and tension is placed on the airbag by a load force. This stress is particularly acute within the attachment region. Such tension can cause the airbag cushion to tear out from its sandwiched position between the retaining member and the housing. The tearing may be especially problematic within low clamp areas. The attachment region of the airbag cushion may be reinforced to resist load forces. Such reinforcement may be accomplished by securing one or more layers of reinforcement material to the attachment region of the airbag cushion. It has been found that an attachment region that is reinforced with about 3 to about 10 layers of reinforcement material may assists in withstanding the load forces of inflation.

One or more load controlling cutouts can be positioned within the attachment region such that the load force is shifted from a low clamp region to a high clamp region. When an even number of load controlling cutouts are used, the cutouts may be positioned on opposite sides of the inflation opening. Such opposing cutouts can be generally parallel to each other. The load controlling cutouts may be curved or straight in nature. When the airbag cushion is reinforced with a plurality of layers of reinforcement material, the load controlling cutout can traverse all but one layer of reinforcement material. Alternatively, the load controlling cutout can leave intact multiple layers of reinforcement material. The load controlling cutout can be formed by a slit that traverses fewer than all of the layers of reinforcement material. Additionally, a series of perforated holes that traverses fewer than all of the layers of reinforcement material can also be used.

The airbag cushion may be attached to the housing at attachment points within the attachment region. The attachment points allow a fastener such as a bolt to be passed through the attachment region to the housing. In general, the airbag cushion is secured to the housing at three or more attachment points. The attachment points may be evenly spaced around an inflation opening in the attachment region. The load controlling cutout may have a length equal to about 30% to about 90% of the distance between any two attachment points. It has been found that a load controlling cutout with a length equal to about two-thirds of the distance between two attachment points can shift the load force from a low clamp area to a high clamp area.

BRIEF DESCRIPTION OF THE DRAWINGS

A more particular description of the invention briefly described above will be rendered by reference to specific embodiments thereof which are illustrated in the appended drawings. These drawings depict only typical embodiments of the invention and are not therefore to be considered to be limiting of its scope. The invention will be described and explained with additional specificity and detail through the use of the accompanying drawings in which:

FIG. 6 is a perspective view of an additional embodiment of the airbag cushion of the present invention.

DETAILED DESCRIPTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

Figure 1:
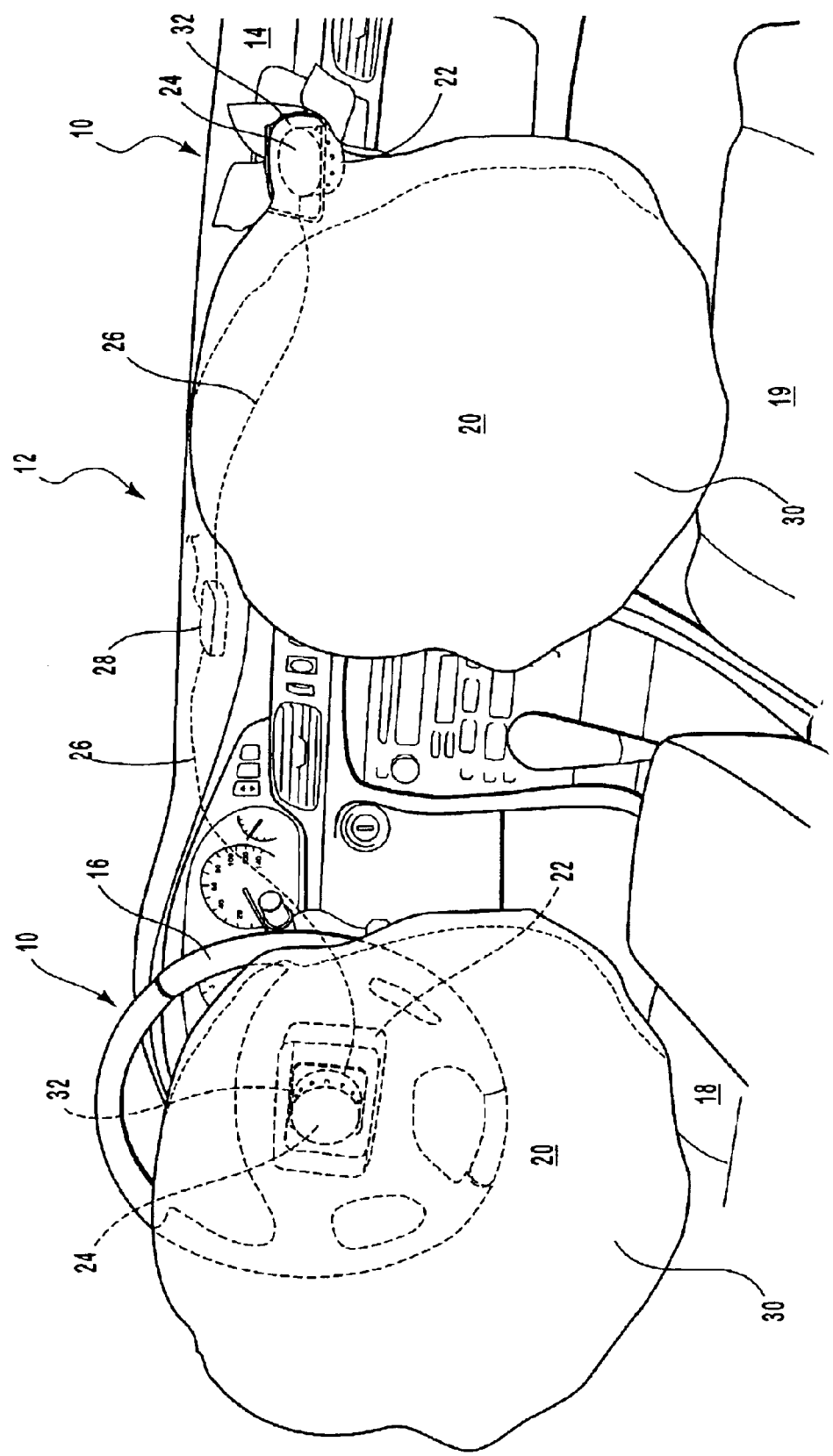
FIG. 1 is a perspective view of a front seating area of a vehicle showing two airbag modules of the present invention.

Referring to FIG. 1, two inflatable airbag modules 10 are depicted in the front seating area of a vehicle. The airbag modules 10 are shown installed within the dash board 14 adjacent the passenger's seat 19 and in the steering column adjacent the driver's seat 18. The airbag module 10 has an inflatable airbag cushion 20 which is secured to a housing 22 through an attachment region 32 adjacent the base 33 of the airbag cushion 20. The housing 22 is securely fastened within the dash board 14 or steering column 16.

The airbag cushion 20 is generally stored within the housing in a folded, compact configuration. An inflator 24 is secured to the housing 22. The inflator 24 is positioned such that inflation fluid can flow from the inflator 24 into the airbag cushion 20.

An accelerometer 28 or other impact detector 28 can be installed within the dash board 14 or at another location within the vehicle. When the impact detector 28 senses that the vehicle has or will experience a sufficiently severe impact, an electronic signal can be sent from the impact detector 28 through lines 26 and activate the inflators 24. Typically, the inflators 24 are gas generators which contain either compressed gas or can create pressurized gas through a chemical reaction. Thus when the vehicle experiences a sufficiently severe impact, the inflators 24 infuse the pressurized inflation fluid into the airbag cushions 20 causing an inflatable region 30 of the cushions 20 to inflate to protect an occupant of the vehicle.

Figure 2:
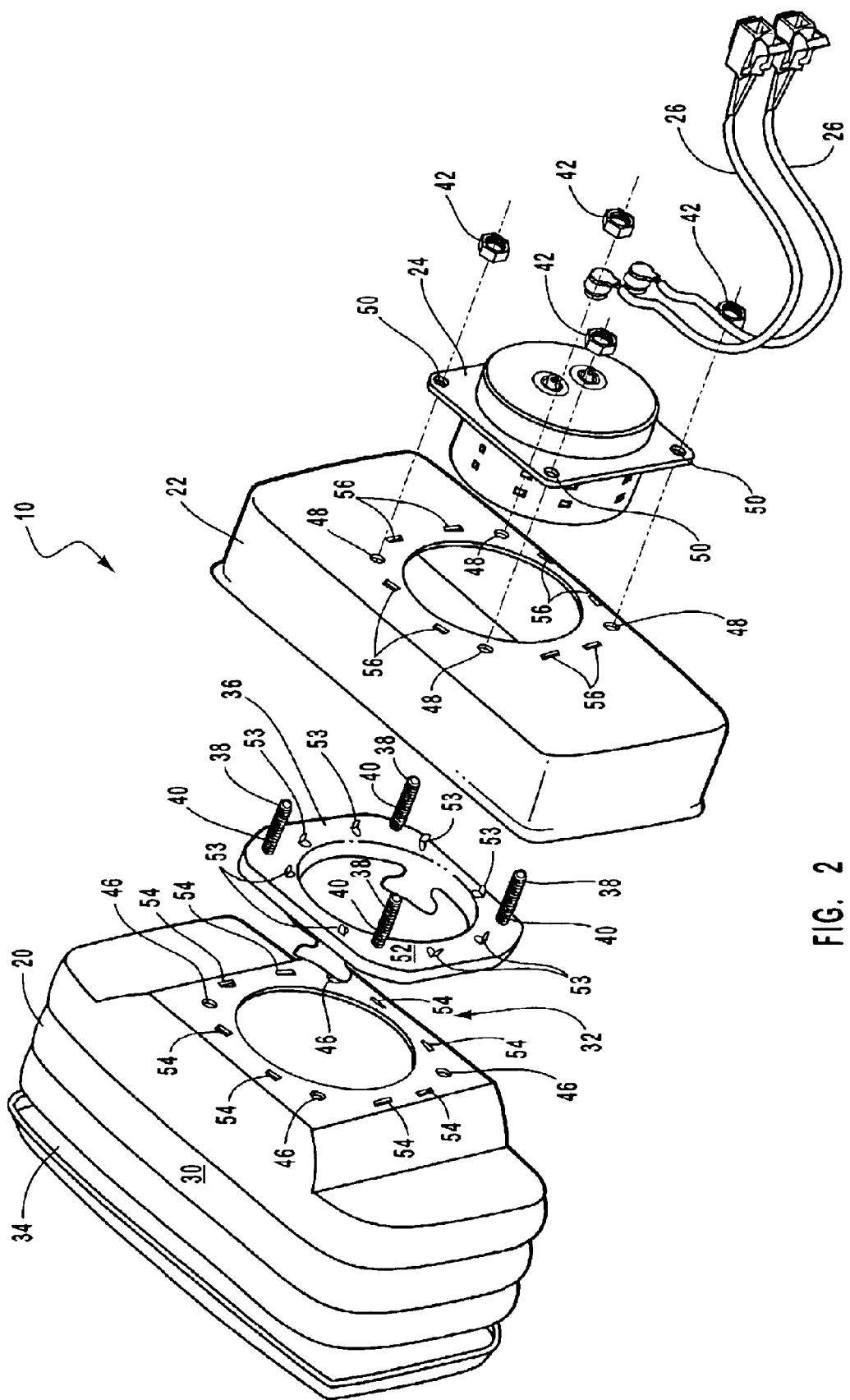
FIG. 2 is an exploded view of an airbag module of the present invention.

Referring now to FIG. 2, an exploded view of an airbag module 10 of the present invention is shown. The airbag cushion 20 of the module is shown in a compact, folded configuration. The inflatable region 30 of the cushion 20 is folded such that the airbag cushion can fit within the housing 22. A housing cover 34 can be placed over the airbag cushion 20 and housing 22 such that the airbag cushion 20 is protected from damage while stored within the steering column or dashboard.

Prior to placement of the airbag cushion 20 within the housing 22 a retaining member 36 can be inserted into the inflation opening 44 in the base 33 of the airbag cushion 20. The retainer 36 has a series of fasteners 38 which can be inserted into corresponding holes or attachment points 46 in the attachment region 32 of the cushion 22. Such fasteners 38 can then be passed through openings 48 in the housing 22 and openings 50 in the inflator. When a fastener 38 such as a threaded bolt 40 is used, nuts 42 can be inserted on to the ends of the bolts 40 and tightened. The attachment region 32 of the airbag cushion is thus sandwiched between the bottom side 52 the retainer member 36 and the housing 22.

A clamping force is created by the tightened fastener 38. The clamping force holds the airbag cushion 20 and any layers of reinforcement material between the housing 22 and the retainer member 36. The clamping force is strongest closest to the fasteners 38 and gradually weakens as distance from the fastener increases. This lessening of the clamping force can be attributed to the flexing of the retaining member 36 and the housing 22 in the region distal from the fasteners 38. Where the clamping force is highest in the area near the fasteners 38, a high clamp region is created. Similarly, in the area between fasteners where the clamping force is weakest a low clamp region is created.

The portion of the airbag cushion 20 sandwiched in the high clamp region is subjected to a high compression force because of the proximity to the tightened fastener 38. However, in the low clamp region airbag cushion 20 is held in place by a much weaker compression or clamping force.

In a standard airbag cushion, this difference in clamping force can allow the attachment region 32 to tear out from under the retainer member 36, especially in the low clamp regions when the airbag cushion is inflated. Such tearing can result in loss of structurally integrity of the airbag cushion 20. Moreover, the cushion 20 may improperly inflate or rapidly deflate because of the tearing.

In an effort to prevent the release of the cushion 20 from the retainer member 36, the retaining member 36 may have a plurality of positioning extensions 53 extending from its bottom side 52. The positioning extensions 53 can be fit through holes 54 in the attachment region 32 of the airbag cushion 20. Corresponding receiving holes 56 are in the housing 22. The positioning extensions 53 provide a stabilizing resistance to the tearing forces of inflation.

Figure 3:
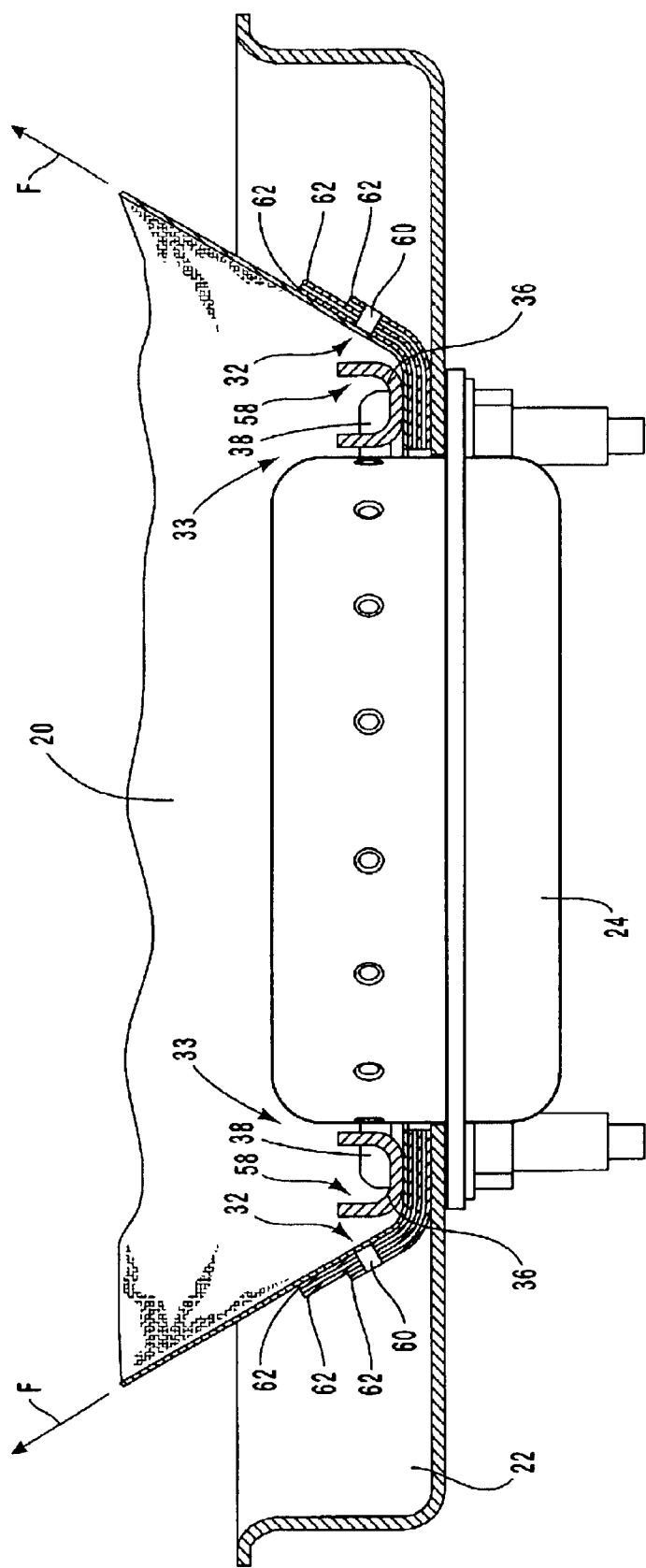
FIG. 3 cross-sectional view of an airbag module of the present invention.

Referring now to FIG. 3, a cross-sectional view of an airbag module of the present invention is presented. The airbag cushion is shown mounted to a housing 22 and inflator 24 by a retaining member 36. The attachment region 32 of the airbag cushion is clamped between the retaining member 36 and the housing 22. The attachment region 32 is reinforced by a plurality of layers of reinforcement material 62.

Typically the reinforcement material is made of the same material as the airbag cushion 20. However, materials such as other fabrics, plastics, paperboard, paper, etc. can be used to reinforce the attachment area. Such reinforcement layers 62 fortify the attachment region 32 of the cushion 20. The reinforcement layers 62 can effectively prevent the airbag cushion 20 from tearing out from the high clamp region adjacent the fasteners 38. Additionally, the reinforcement layers 62 give added resistance to tearing in the low clamp regions.

The number of reinforcement layers 62 used may vary depending on the strength of the airbag material used, the strength and thickness of the reinforcement material, and the strength of the inflator. For example if a powerful inflator is used with a relatively weak airbag material, a large number of reinforcement layers may be required. However, if a weaker inflator or stronger airbag material is used, then fewer layers may be required. It has been found that about 3 to about 10 layers of reinforcement material can be used in most instances.

Even when the attachment region 32 is fortified with reinforcement layers 60, the attachment region 32 of the airbag 20 can tear out from its sandwiched position between the housing 22 and the retaining member 36. The addition of positioning extensions 53 can further assist in preventing tearing from under the retainer member 36. However, airbag cushions 22 can still tear especially in the low clamp regions.

To further alleviate the problems associated with tearing in the low clamp regions, a load controlling cutout 60 can be positioned within the attachment region of the airbag. The cutouts 60 transfer the load force F of inflation from the low clamp region to the high clamp region.

Figure 4:
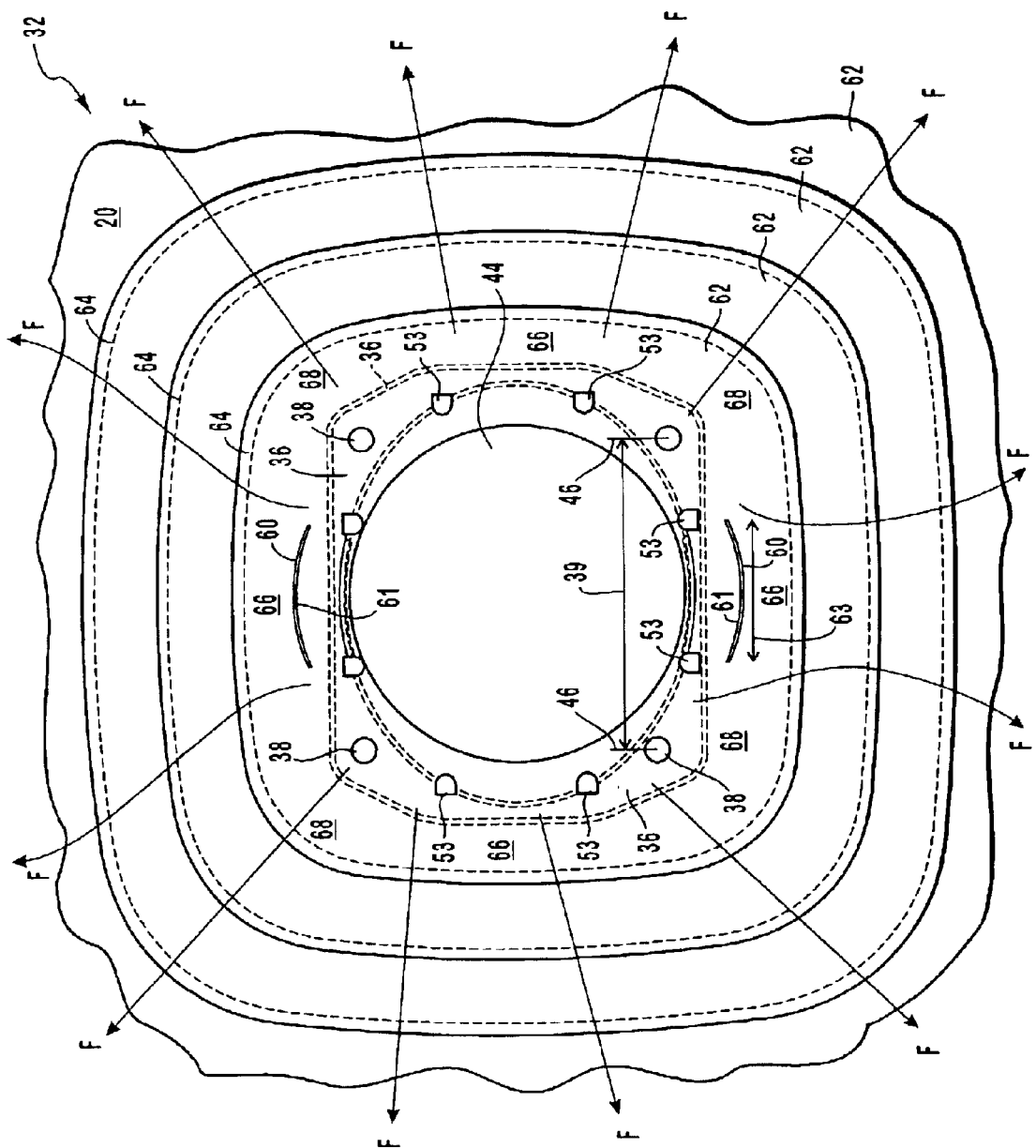
FIG. 4 is a perspective view of the attachment region of an airbag cushion of the present invention.

Referring now to FIG. 4, a perspective view of the attachment region 32 of an embodiment of the airbag module of the present invention is shown. The attachment region 32 is reinforced with multiple layers 62 of a reinforcement material. In the embodiment of FIG. 4, a total of four reinforcement layers 64 are shown including the layer of the airbag cushion 20. In certain configurations, the reinforcement material may be the same fabric from which the airbag 20 is constructed. Alternatively other natural and synthetic fabrics may be used as the reinforcement material. Such fabric may include nylon, polyester, cotton, hemp, blends of natural and synthetic fibers, and the like. Likewise, plastics, metal foil, paper, and paper board may be used to reinforce the attachment region 32 of the airbag 20.

As the airbag module is assembled, a retaining member 36 is inserted through the inflation opening 44. The retaining member 36 can then be secured to a housing by fasteners 38. When these fasteners are secured, a high clamp region 68 is created adjacent the fasteners 38. While a low clamp region 66 is generated in the area between fasteners 38. The high clamp regions 68 are generated by the clamping force of the housing, retaining member, and fasteners 38 against the attachment region 32 with its reinforcement layers 62. This clamping force decreases in areas further away from the fasteners. The decrease in the clamping force is a function of the limited bending stiffness of the retaining member 36.

When the airbag cushion 20 is inflated, a load force stresses the attachment region 32 potentially ripping the portion of the attachment region 32 clamped in a low clamp region 66 out from between the housing and the retaining member 36. The load force pulls the attachment region 32 radially outwardly from the inflation opening 44.

A load controlling cutout 60 can be positioned to redirect the load force F from a low clamp region 66 to a high clamp region 68. As the airbag cushion 20 inflates, a force F pulls at every point within the attachment region. The load controlling cutout 60 provides a small amount of slack in the low clamp region 66 of the inflating cushion 20. Because airbag systems are designed to inflate in a fraction of a second, this small amount of slack allows the force F pulling on a point within the low clamp region 66 to be shifted to the high clamp region 68 as the bag 20 is pulled taught. In other words, the load controlling cutout can give slightly allowing the pull to be shifted to the high clamp region adjacent the fastener 38.

A load controlling cutout 60 can be configured in a variety of ways provided the cutout 60 is long and deep enough to provide the needed slack within the low clamp region 66. For example, a load controlling cutout 60 is positioned in a low camp region 66 between fasteners 38. The load controlling cutout 60 can be a slit 61 traversing one or more layers of the reinforcement material. Generally the slit 61 may traverse all but one layer of the reinforcement material, leaving only the bottom layer or the layer formed by the airbag cushion 20 uncut. Such slits 61 may be cut by means known in the art such as by a knife, scissors, laser, heat, or other similar cutting means.

A load controlling cutout 60 does not add to the cost of the airbag module 10. Because the load controlling cutout 60 addresses the problem of the cushion tearing in low clamp regions 66 without requiring additional reinforcements or fasteners, the cost of materials required for the airbag module 10 may be reduced. Because an airbag module with a load controlling cutout 60 can use a minimum number of fasteners, the time and effort required to assemble and install the airbag module may be further reduced.

The length 63 of the load controlling cutout can varying depending on the size of the airbag cushion 20, inflator 24, the housing 22, and the retaining member 36. However, it has generally been determined that a cutout 60 having a length 63 in the range from about 30 percent to about 90 percent of the distance 39 between two attachment points 46 is sufficient to properly shift the force F from a low clamp region 66 to a high clamp region 68. Alternatively a load controlling cutout 60 can have a length 63 equal to about two-thirds of the distance 39 between two attachment points 46. The load controlling cutouts 60 can also be curved or linear. Such curved cutouts 60 may follow the general contour of the airbag cushion 20.

Figure 5:
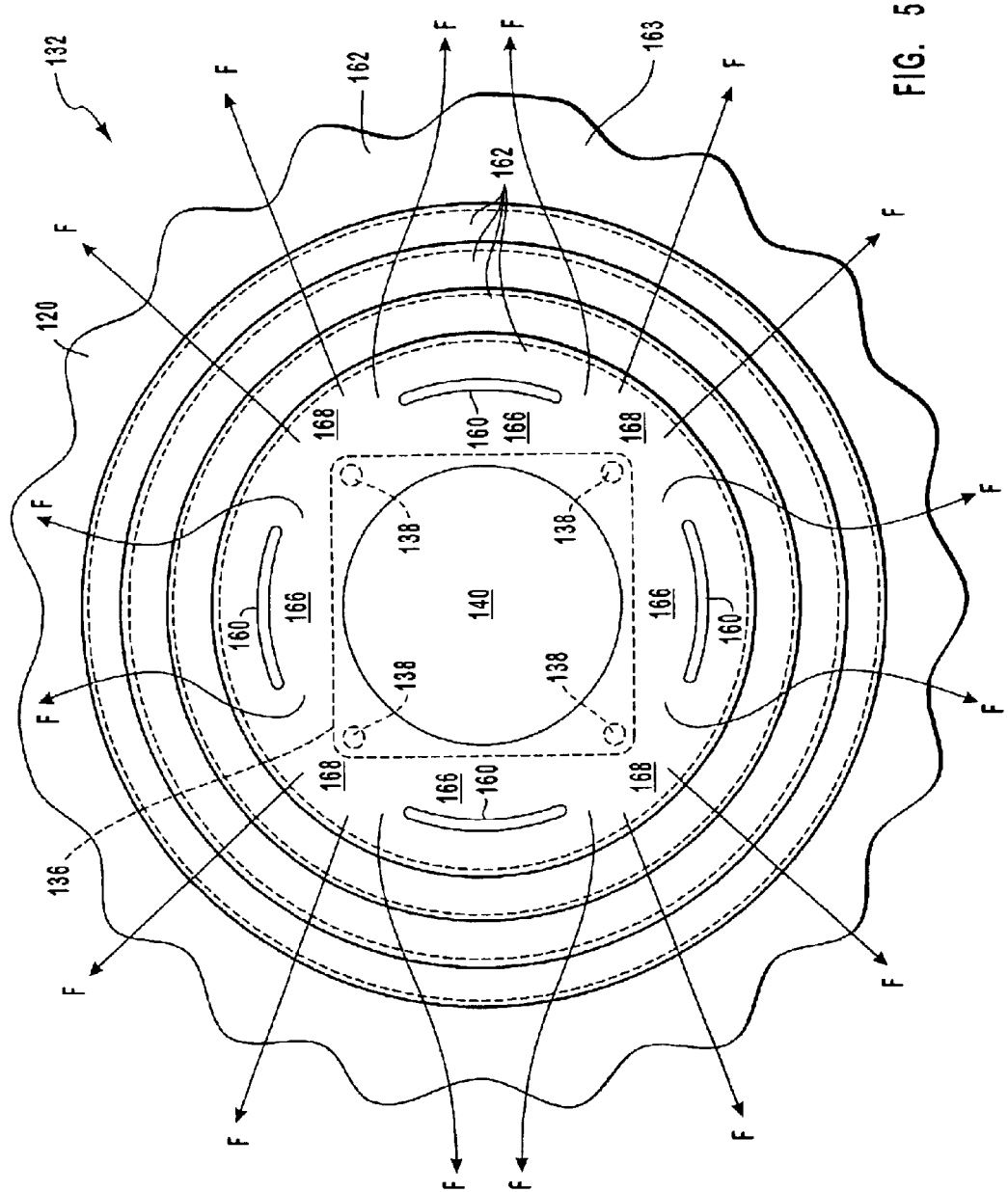
FIG. 5 is a perspective view of an additional embodiment of an airbag cushion of the present invention.

Referring now to FIG. 5, an alternative embodiment of an airbag cushion 120 with four load controlling cutouts 160 in the attachment region 132 is shown. In the embodiment of FIG. 5, five layers of reinforcement material including the layer of the airbag cushion itself 120 have been used to fortify the attachment region 132.

Four load controlling cutouts 160 are positioned within the attachment region 132 in low clamp areas 166. Each of these load controlling cutouts 160 traverses one or more layers 162 of the reinforcement material 162, but leaves at least the bottom layer 163 intact which is the layer formed by the airbag cushion 120.

Four load controlling cutouts 160 may be desirable when the airbag cushion 120 is inflated with a large inflator. With four load controlling cutouts, the load forces F are shifted from all four of the low clamp regions 166 to the high clamp regions 168 near the fasteners 138. With such a configuration, fewer or lighter weight reinforcement layers 162 may be needed to prevent the attachment region 132 from tearing out from between the housing and the retaining member 136.

Referring now to FIG. 6, the attachment region 232 of an airbag cushion 220 is presented. In the embodiment of FIG. 6, a retaining member 236 with three fasteners 238 is used. Because of the significant redirecting of the load force F by the load controlling cutouts 260, the number of fasteners 238 can be reduced to three. Such a reduction in the number of fasteners 238, reduces the cost of manufacture of the airbag module by reducing the number of parts and the amount of labor required to assemble the module. Moreover, costs associated with shipping and installation of the airbag module may be further reduced because of the use of fewer fasteners and the associated reduction in weight.

The attachment region 232 of the airbag cushion 220 is reinforced by seven layers of reinforcement material including the layer created by the cushion 220 itself. As discussed previously, the number of the reinforcement layers 232 can vary depending on the size of inflator, the properties of the retaining member 236 and housing, and the thickness and strength of the reinforcement layers 232.

Three load controlling cutouts 260 are positioned within the low clamp regions 266 between the fasteners 238. A series of perforated holes 265 forms each of the load controlling cutouts 260. The load controlling cutouts 260 traverse one or more layers of the reinforcement material 262. At least the bottom layer of reinforcement material 263 which is formed by the airbag cushion 220 is left intact. Leaving the bottom layer 263 intact, allows the cushion to inflate without inflation gas leaking through the load controlling cutout 260. Such leakage of inflation gas can cause the airbag cushion to improperly inflate or deflate too rapidly. Such airbag malfunction may prevent the optimal protection of a vehicle occupant during an impact.

A series of perforated holes 265 are configured to form a load controlling cutout 260 when a load force F is applied to the inflating cushion 220. As the load force F stresses points of the attachment region 232 in the low clamp region 266, the portion of fabric 267 between the perforations 265 can tear creating a continuous load controlling cut out 260. This tearing creates a continuous cutout 260 and provides a certain amount of slack within the attachment region 232. This slack allows the load force F to be directed around the low clamp region 266 and to the high clamp region 268 thereby preventing the cushion from tearing out from the retaining member.

The use of a series of perforated holes 265 to form a single load controlling cutout 260 may aid in the assembly and installation of the airbag module. The series of perforated holes 265 does not completely sever the layers of reinforcement material 262. Because the surface of the attachment region 232 is still intact, no flap of fabric is created by the series of perforations 265 as may be created by a continuous slit cutout. When the surface is completely severed by a load controlling cutout, a flap may appear which can interfere with tools, fasteners, and the like used in the assembly and installation of the airbag module. However, it will be appreciated that even when the load controlling cutout completely severs the reinforcement layers 262, the resulting flap does not create an obstacle to proper function of the airbag cushion.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. An airbag cushion for protecting an occupant of a vehicle from an impact comprising:
    an inflatable region configured to protect the vehicle occupant; and
    an attachment region for securing the airbag to a housing with a retaining member, the attachment region comprising a load controlling cutout configured to shift a load force from a low clamp region to a high clamp region during inflation of the inflatable region;

wherein the attachment region is reinforced by one or more layers of reinforcement material;

wherein the load controlling cutout traverses all but one layer of reinforcement material.

2. The airbag cushion of claim 1, wherein the attachment region is reinforced by about 3 to about 10 layers of reinforcement material.

3. The airbag cushion of claim 2, wherein the load controlling cutout traverses all but one layer of reinforcement material.

4. The airbag cushion of claim 1, further comprising three or more attachment points within the attachment region for securing the airbag cushion to the housing with the retaining member.

5. The airbag cushion of claim 4, wherein the load controlling cutout has a length equal to about 30% to about 90% of the distance between two attachment points.

6. The airbag cushion of claim 4, wherein the load controlling cutout has a length equal to about two-thirds of the distance between two attachment points.

7. The airbag cushion of claim 1, wherein the load controlling cutout comprises a series of perforated holes within the attachment region.

8. The airbag cushion of claim 1, wherein the load controlling cutout comprises a slit within the attachment region.

9. The airbag cushion of claim 1, further comprising a second load controlling cutout within the attachment region.

10. An airbag cushion for protecting an occupant of a vehicle from an impact comprising:

an inflatable region configured to protect the vehicle occupant; and an attachment region for securing the airbag to a housing with a retaining member, the attachment region comprising an inflation opening and a first load controlling cutout within the attachment region, the first load controlling cutout configured to shift a load force from a low clamp region to a high clamp region during inflation of the inflatable region, wherein the first load controlling cutout is separate from the inflation opening.

11. The airbag cushion of claim 10, wherein the attachment region comprises about 3 to about 10 layers of reinforcement material.

12. The airbag cushion of claim 11, wherein the first load controlling cutout traverses all but one layer of the reinforcement material.

13. The airbag cushion of claim 10, further comprising three or more attachment points within the attachment region for securing the airbag cushion to the housing with the retaining member.

14. The airbag cushion of claim 13, wherein the first load controlling cutout has a length equal to about 30% to about 90% of the distance between two attachment points.

15. The airbag cushion of claim 13, wherein the first load controlling cutout has a length equal to about two-thirds of the distance between two attachment points.

16. The airbag cushion of claim 10, further comprising four attachment points within the attachment region for securing the airbag cushion to the housing with the retaining member.

17. The airbag cushion of claim 16, further comprising a second load controlling cutout positioned generally parallel to the first load controlling cutout within the attachment region.

18. The airbag cushion of claim 10, wherein the first load controlling cutout comprises a series of perforated holes within the attachment region.

19. The airbag cushion of claim 10, wherein the first load controlling cutout comprises a slit within the attachment region.

20. The airbag cushion of claim 10, further comprising a second load controlling cutout within the attachment region, wherein the second load controlling cutout is separate from the inflation opening.

21. An inflatable restraint device for protecting an occupant of a vehicle from an impact comprising:

an airbag cushion having an attachment region for securing the airbag to a housing with a retaining member, the attachment region comprising a plurality of attachment points for securing the airbag cushion to a housing with a retaining member, the attachment region further comprising a plurality of high clamp regions within the attachment region adjacent the attachment points, a plurality of low clamp regions distal from the attachment points, and a plurality of load controlling cutouts within the low clamp region;

wherein each of the load controlling cutouts is positioned to shift a load force from at least one of the low clamp regions to at least one of the high clamp regions;

wherein a first load controlling cutout of the plurality of load controlling cutouts runs generally parallel to a second load controlling cutout of the plurality of load controlling cutouts, wherein the second load controlling cutout is separate from the first load controlling cutout.

22. The inflatable restraint device of claim 21, the attachment region further comprising a plurality of layers of reinforcement.

23. The inflatable restraint device of claim 22, wherein the attachment region comprises about 3 to about 10 layers of reinforcement material.

24. The inflatable restraint device of claim 23, wherein the load controlling cutouts leave intact two or more layers of the reinforcement material.

25. The inflatable restraint device of claim 23, wherein the load controlling cutouts traverse all but one layer of the reinforcement material.

26. The inflatable restraint device of claim 21, wherein the plurality of attachment points comprises three or more attachment points within the attachment region for securing the airbag cushion to the housing with the retaining member.

27. The inflatable restraint device of claim 26, wherein each load controlling cutout has a length equal to about 30% to about 90% of the distance between two attachment points.

28. The inflatable restraint device of claim 26, wherein each load controlling cutout has a length equal to about two-thirds of the distance between two attachment points.

29. The inflatable restraint device of claim 21, wherein the plurality of attachment points comprises four attachment points within the attachment region for securing the airbag cushion to the housing with the retaining member.

30. The inflatable restraint device of claim 21, wherein each load controlling cutout comprises a series of perforated holes within the attachment region.

31. The inflatable restraint device of claim 21, wherein each load controlling cutout comprises a slit within the attachment region.

32. An inflatable restraint device for protecting an occupant of a vehicle comprising:

a housing configured to be anchored to a vehicle;

an airbag cushion having an attachment region with three or more attachment points whereby the airbag is attached to the housing by a retaining member, the attachment region further comprising a high clamp region formed by the housing and the retaining member adjacent the attachment points, a low clamp region formed by the housing and the retaining member distally from the attachment points, and a load controlling cutout within a low clamp region positioned to shift a load force from the low clamp region to the high clamp region, wherein the load controlling cutout has a length equal to about 30% to about 90% of the distance between two attachment points, wherein the load controlling cutout leaves at least a layer formed by the airbag cushion; and an inflator configured to inflate the airbag cushion.

33. The inflatable restraint device of claim 32, wherein the attachment region comprises about 3 to about 10 layers of reinforcement material.

34. The inflatable restraint device of claim 33 wherein the load controlling cutout leaves intact two or more layers of the reinforcement material.

35. The inflatable restraint device of claim 33, wherein the load controlling cutout traverses all but one layer of the reinforcement material.

36. The inflatable restraint device of claim 32, wherein the load controlling cutout has a length equal to about two-thirds of the distance between two attachment points.

37. The inflatable restraint device of claim 32, wherein the attachment points comprise four attachment points within the attachment region for securing the airbag cushion to the housing with the retaining member.

38. The inflatable restraint device of claim 37, wherein the load controlling cutout runs generally parallel to a second load controlling cutout of the attachment region.

39. The inflatable restraint device of claim 32, wherein the load controlling cutout comprises a series of perforated holes within the attachment region.

40. The inflatable restraint device of claim 32, wherein the load controlling cutout comprises a slit within the attachment region.

41. An airbag cushion comprising:
two attachment points whereby the airbag can be attached to a housing, high clamp regions adjacent the attachment points, and a low clamp region distal from the attachment points;
an inflatable region configured to protect the vehicle occupant; and
a load controlling cutout extending generally along the low clamp region, parallel to a displacement between the attachment points to transfer a load force from the low clamp area to the high clamp areas, wherein the load controlling cutout leaves at least a layer formed by the airbag cushion.

42. The airbag cushion of claim 41, wherein the attachment region comprises about 3 to about 10 layers of reinforcement material.

43. The airbag cushion of claim 42 wherein the load controlling cutout leaves intact two or more layers of the reinforcement material.

44. The airbag cushion of claim 42, wherein the load controlling cutout traverses all but one layer of the reinforcement material.

45. The airbag cushion of claim 41, wherein the load controlling cutout has a length equal to about 30% to about 90% of the distance between the attachment points.

46. The airbag cushion of claim 41, wherein the load controlling cutout has a length equal to about two-thirds of the distance between the attachment points.

47. The airbag cushion of claim 41, further comprising two additional attachment points for securing the airbag cushion to the housing.

48. The airbag cushion of claim 47, wherein the load controlling cutout runs generally parallel to a second load controlling cutout.

49. The airbag cushion of claim 41, wherein the load controlling cutout comprises a series of perforated holes.

50. The airbag cushion of claim 41, wherein the load controlling cutout comprises a slit.

* * * * *